(12) United States Patent
Zhang (10) Patent No.: US 7,899,479 B2
(45) Date of Patent: Mar. 1, 2011

(54) METHOD, SYSTEM AND APPARATUSES FOR SHARING PRESENCE INFORMATION

(75) Inventor: Quan Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 581 days.

(21) Appl. No.: 11/955,720

(22) Filed: Dec. 13, 2007

(65) Prior Publication Data

US 2008/0125157 A1 May 29, 2008

Related U.S. Application Data (63) Continuation of application No. PCT/CN2006/002890, filed on Oct. 27, 2006.

(30) Foreign Application Priority Data

Dec. 30, 2005 (CN) .................. 2005 1 0003575

(51) Int. Cl.
*H04B 7/00* (2006.01)
*H04M 3/42* (2006.01)
*H04W 4/00* (2009.01)

(52) U.S. Cl. .............. 455/519; 455/416; 455/517; 455/518; 455/435.1

(58) Field of Classification Search .......... 455/17, 455/518, 519, 421, 517, 416
See application file for complete search history.

(56) References Cited

U.S. PATENT DOCUMENTS

| | | | |
|---|---|---|---|
| 7,047,030 B2 * | 5/2006 | Forsyth | 455/518 |
| 7,471,961 B2 * | 12/2008 | Fabien et al. | 455/519 |
| 7,797,010 B1 * | 9/2010 | Manroa et al. | 455/519 |
| 7,818,020 B1 * | 10/2010 | Manroa et al. | 455/519 |
| 2007/0214217 A1 * | 9/2007 | Ueno et al. | 709/204 |

FOREIGN PATENT DOCUMENTS

| | | |
|---|---|---|
| CN | 1435974 A | 8/2003 |
| CN | 1617542 A | 5/2005 |
| CN | 1663216 A | 8/2005 |
| WO | 03/034672 A1 | 4/2003 |
| WO | 2005/025131 A1 | 3/2005 |

OTHER PUBLICATIONS

Huawei Wang Zheng, "PoC group presence", Apr. 25, 2004, pp. -2, XP002518803.
Open Mobile Alliance: OMA-AD-PoC-V1-0-20040204-D: "Push to talk to over cellular Architecture", 3GPP Draft 3rd Generation Partnership Project, Mobile Competence Centre, Feb. 5, 2004, XP050070119.

* cited by examiner

*Primary Examiner*—Tilahun Gesesse

(57) ABSTRACT

Embodiments of the present invention provide a method for sharing presence information, including: acquiring group presence information and sending the group presence information to a group member. Embodiments of the present invention also provide a system and apparatuses for sharing presence information. The system includes a group presentity sub-system capable of acquiring the group presence information and sending the group presence information to the group member. The apparatuses include a group server, a presence server and a presence information management apparatus. With the method, system and apparatuses provided by the embodiments of the present invention, group members may conveniently share the presence information of each other, which also enriches the service functions of a single group service.

19 Claims, 8 Drawing Sheets

METHOD, SYSTEM AND APPARATUSES FOR SHARING PRESENCE INFORMATION

FIELD OF THE INVENTION

The present invention relates to information processing techniques, and more particularly, to a method, system and apparatuses for sharing presence information.

BACKGROUND OF THE INVENTION

A group service provides a user with communication information in batch. When a group is set, the user may transmit messages (including short messages, multimedia messages, instant message or emails), or initiate multiparty conferences or Push-to-talk over Cellular (PoC) calls using the group service. In the group service, a group member or a user outside the group may share basic information of the group to a certain extent according to a group policy. The basic information of the group (i.e. the basic group information) includes a group attribute, a group member list and a group member attribute.

A presence service is a communication service for collecting and publishing presence information. The presence information includes user willingness information, network connection status information, etc. The user willingness information includes a status attribute indicating communication willingness of a user, such as willing or not willing. The user willingness information also includes willingness information relevant to specified applications, such as willing for PoC or not willing for Instant Messaging (IM). The user willingness information is managed by a user. The network connection status information includes a status attribute of the connection between user equipment and the network, e.g., whether the user equipment is powered on, whether the user is in the service area, whether the user has logged on to an IM system. The network connection status information is controlled by the network. The presence information may further include: one or multiple contact manners and addresses (e.g., telephone numbers or email addresses), location information, personal information of the user (e.g., moods, favorites, languages, icons, etc.), time zone of the user and terminal capacity of the user. An entity subscribing to the presence information is called watcher and an entity publishing the presence information is called presentity.

In the prior art, the group service and the presence service are independent of each other. A user can only share the basic information of his home group through the group service, and the user can only acquire the presence information of the user himself through the presence service. When a group member wishes to acquire the presence information of a second member in the group, the group member has to submit a request to a presence server, and the presence server verifies the identity and right of the group member to determine whether to provide the presence information of the second group member for the group member. When the group member wishes to acquire the presence information of all the other members in the group, the group member has to submit a request to the presence server again and again for the presence information of each of all the other members. The presence server should verify the identity and right of the group member each time the group member summits a request. The whole process will be lengthy and inconvenient for sharing presence information in the group.

SUMMARY OF THE INVENTION

Embodiments of the present invention provide a method for sharing presence information as well as a system and apparatuses for sharing presence information, which enable group members to share presence information conveniently.

According to an embodiment, a method for sharing presence information includes:

acquiring group presence information; and sending the group presence information to a group member.

According to an embodiment, a system for sharing presence information includes: a group presentity sub-system and at least one group member; the group presentity sub-system is capable of acquiring group presence information and sending the group presence information to one of the at least one group member.

Apparatuses for sharing presence information include: a group server, a presence server and a presence information management apparatus.

The group server includes: a subscription unit, a subscription unit, capable of receiving a subscription request for subscribing to group presence information from a group member, and sending a subscription request for subscribing to presence information of at least one group member according to basic group information; and a presence information transceiver unit, capable of receiving the presence information of the at least one group member, and sending the group presence information comprising the basic group information and the presence information of the at least one group member to the group member according to the subscription request from the group member.

The presence server includes: an information subscription unit, capable of receiving a subscription request for subscribing to group presence information from a group member; and a presence information transmission unit, capable of receiving basic group information from a group server, and sending the group presence information comprising the basic group information and presence information of at least one group member to the group member according to the subscription request.

The presence information management apparatus includes: a subscription module, capable of receiving a subscription request from a group member for subscribing to group presence information; and a presence information transceiver module, capable of receiving basic group information from a group server and presence information of at least one group member from a presence server, and sending group presence information comprising the basic group information and the presence information of the at least group member to the group member according to the subscription request.

Compared with the prior art, the embodiments of the present invention have the following advantages. In conjunction of the group service and the presence service, the members in one group are enabled to share the presence information of each other conveniently because the members in one group have fewer authorization restrictions. The embodiments of the present invention not only enable presence information sharing, but also enrich the functions of the group service. And added services such as community and chat room services can therefore be provided based on varieties of basic information of the group.

DETAILED DESCRIPTION OF THE INVENTION

Embodiments of the present invention are further described in detail hereafter with reference to the accompanying drawings.

In accordance with an embodiment of the present invention, a method for sharing presence information includes: acquiring group presence information and sending the group presence information to group members.

Figure 1:
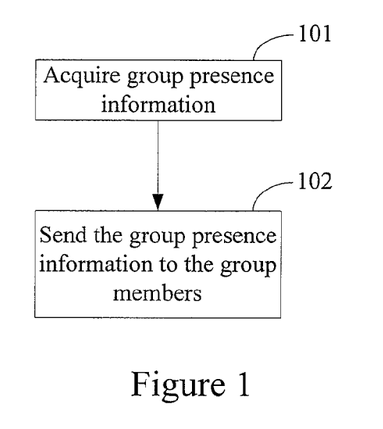
FIG. 1 is a flowchart of a method for sharing presence information in accordance with an embodiment of the present invention.

FIG. 1 is a flowchart of a method for sharing presence information in accordance with an embodiment of the present invention. As shown in FIG. 1, the method is described below.

Action 101: Acquire group presence information.

This Action may be performed in multiple manners in practical applications, and three manners are given below to further explain the process of performing this Action.

In a first manner, a presence server sends presence information of group members to a group server, and the group server acquires the group presence information according to the presence information of the group members from the presence server and basic group information saved in the group server.

In the first manner, before the presence server sends the presence information of the group members to the group server, the group server may subscribe to the presence information of the group members in the presence server and send a group member list to the presence server, so that the presence server may send to the group server the presence information of members in the group member list.

Optionally, the presence server may send the presence information of the group members to the group server periodically or in real time.

In a second manner, the group server sends the basic group information to the presence server, and the presence server acquires the group presence information based on the basic group information and the presence information of the group members saved in the presence server.

The group server may send the basic group information to the presence server periodically or in real time. Optionally, the presence server may initiate a subscription request to the group server to subscribe to the basic group information, and the group server sends the basic group information to the presence server according to the subscription request.

In a third manner, a group presence information management apparatus is configured in advance. The group server sends the basic group information to the group presence information management apparatus, and the presence server sends the presence information of the group members to the group presence information management apparatus. The group presence information management apparatus acquires the group presence information based on the basic group information and the presence information of the group members.

In the third manner, the group server may send the basic group information to the group presence information management apparatus periodically or in real time. Similarly, the presence server may send the presence information of the group members to the group presence information management apparatus periodically or in real time.

Alternatively, after the group server sends the basic group information to the group presence information management apparatus, the group presence information management apparatus sends, based on the basic group information, a subscription request containing the group member list to the presence server to subscribe to the presence information of the group members. And the presence server sends the presence information of the group members to the group presence information management apparatus according to the subscription request.

The group presence information management apparatus may also initiate a subscription request to the group server to subscribe to the basic group information, and the group server sends the basic group information to the group presence information management apparatus according to the subscription request.

Action 102: Send the group presence information acquired to the group members.

If Action 101 is performed in the first manner, the group server sends the group presence information in Action 102. If Action 101 is performed in the second manner, the presence server sends the group presence information in Action 102. If Action 101 is performed in the third manner, the group presence information management apparatus sends the group presence information in Action 102. If an entity sending the group presence information is called a group entity, the group entity is the group server if Action 101 is performed in the first manner; the group entity is the presence server if Action 101 is performed in the second manner; and the group entity is the group presence information management apparatus if Action 101 is performed in the third manner.

In the flowchart shown in FIG. 1, before Action 101, or between Action 101 and Action 102, there may further include the process of a group member initiating a subscription request to subscribe to the group presence information.

The presence information of group members in the flowchart shown in FIG. 1 includes part or all of the presence information of all group members. The group presence information includes part or all of the presence information of all group members, and further includes part or all of the basic group information. Particularly, the basic group information and the presence information of the group members may be combined together.

The group presence information may be acquired according to an authorization policy and a receiving policy.

For example, in practical applications, a group member may set an authorization policy in advance, e.g. permitting or refusing the subscription of the group to the presence information of the group member, or determining which presence information of the group member may be subscribed to by other group members and users outside the group. The authorization policy may be published in advance in the presence server, or in the group server, or in the group presence information management apparatus. In such a case, while sending the presence information of the group members to the group server, the presence server sends, according to the authorization policy of the group member, the presence information of the group member authorized to the group server, or to the group members, or to the group presence information management apparatus. While subscribing to the presence information of the group members, the group server subscribes to the presence information of the group member authorized according to the authorization policy of the group member. Similarly, while sending the subscription request to the presence server, the group presence information management apparatus subscribes to the authorized presence information of the group member according to the authorization policy of the group member. Further more, while sending the group presence information to the group members, the group presence information management apparatus sends the presence information of the group member authorized according to the authorization policy.

In addition, if Action 101 is performed in the second manner, a group administrator may set the authorization policy for the group presence information. For example, the group administrator sets which user in the group or outside the group may subscribe to the presence information of the group; or, default policy may also be employed, e.g. group administrator sets that the group members may subscribe to the group presence information while the users outside the group may not subscribe.

A group member may also set a receiving policy in advance for receiving the group presence information. For example, the group member decides to refuse or accept the group presence information, or to accept the group presence information of specified group members, or to accept specified part of the group presence information. Therefore, the group member will actually receive group presence information filtered according to the filtering logic of the receiving policy. The receiving policy may be set in the local apparatus of the group member, and the local apparatus of the group member accepts only the group presence information permitted by the filtering logic of the receiving policy when receiving the group presence information. Or the group member may insert the receiving policy into the subscription request to the group entity, i.e. to the group server if Action 101 is performed in the first manner, or to the presence server if Action 101 is performed in the second manner, or to the group presence information management apparatus if Action 101 is performed in the third manner. Therefore, the group entity sends to the group member the group presence information specified by the group member according to the receiving policy in the subscription request. If an authorization policy has also been set in advance, the group entity will send the information to the group member according to the receiving policy, and the authorization policy.

The group entity may be configured in advance as: sending the presence information of the group members as the group presence information to the group members, or combining the presence information of the group members and the basic group information into the group presence information and sending the group presence information which is combined to the group members, or sending the presence information of the group members and the basic group information to the group members at the same time or separately.

In addition, if Action 101 of the flowchart shown in FIG. 1 is performed in the first manner and if the presence information of a group member changes, the presence server may send the changed presence information of a group member to the group server, and the group server sends the changed presence information of a group member to the group members. If the basic group information changes, the group server may send the changed basic group information to the group members.

If Action 101 of the flowchart shown in FIG. 1 is performed in the second manner and if the basic group information changes, the group server may send the changed basic group information to the presence server, and the presence server sends the changed basic group information to the group members. If the presence information of a group member changes, the presence server sends the changed presence information of a group member to the group members.

If Action 101 of the flowchart shown in FIG. 1 is performed in the third manner and if the basic group information changes, the group server may send the changed basic group information to the group presence information management apparatus; and if the presence information of a group member changes, the presence server may also send the changed presence information of a group member to the group presence information management apparatus. The group presence information management apparatus sends the changed basic group information and the changed presence information of a group member to the group members.

Figure 2:
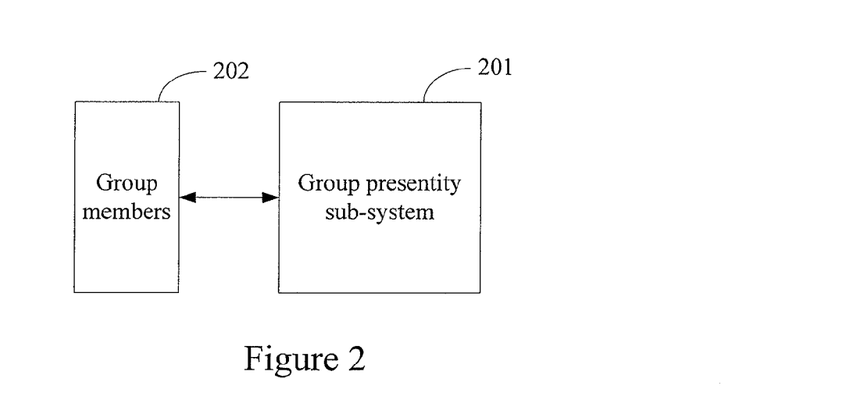
FIG. 2 is a schematic diagram illustrating a structure of a system for the method illustrated in FIG. 1.

FIG. 2 is a schematic diagram illustrating a structure of a system for the method illustrated in FIG. 1. The system includes group presentity sub-system 201 and group member 202.

The group presentity sub-system 201 acquires group presence information and sends the group presence information acquired to the group member 202.

The group member 202 receives the group presence information from the group presentity sub-system 201. The group member 202 may further initiate a subscription request to the group presentity sub-system 201 to subscribe to the group presence information, and the group presentity sub-system 201 sends the group presence information acquired to the group member 202 according to the subscription request.

In practical applications, the system may function in multiple manners, e.g. in the three manners adopted by the flowchart shown in FIG. 1.

Figure 3:
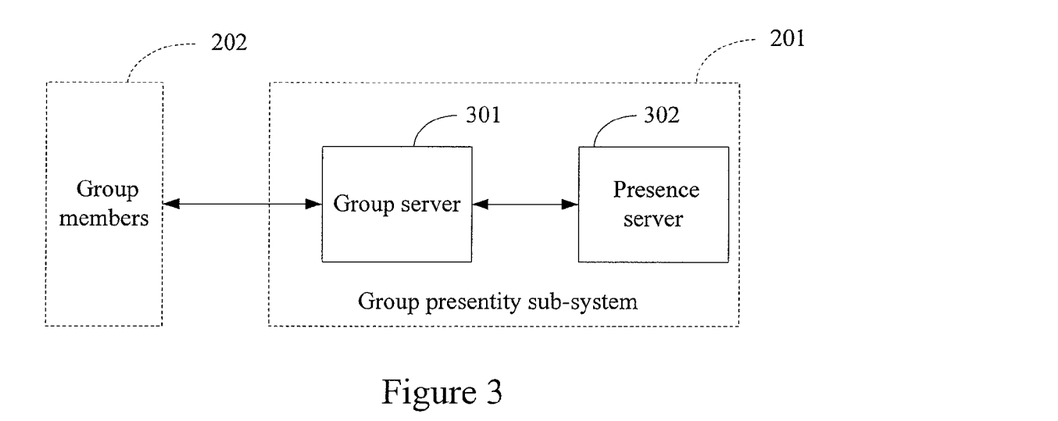
FIG. 3 is a schematic diagram illustrating a detailed structure of the system shown in FIG. 2.

FIG. 3 is a schematic diagram illustrating a detailed structure of the system shown in FIG. 2. As shown in FIG. 3, the group presentity sub-system 201 includes group server 301 and presence server 302. Either the first manner or the second manner for performing Action 101 above can be adopted in the system shown in FIG. 3. The two manners will be described below.

If the first manner is adopted, the presence server 302 sends the presence information of the group members to the group server 301. The group server 301 receives the presence information of the group members from the presence server 302, and acquires the group presence information based on the presence information of the group members and the basic group information stored in the group server 301. The group server 301 sends the group presence information acquired to the group member 202. The group server 301 may further sends a subscription request to the presence server 302 to subscribe to the presence information of the group members so that the presence server 302 sends the presence information of the group members to the group server 301 according to the subscription request. The group server 301 can also receive a subscription request from the group member 202 for subscribing to the group presence information, and send the group presence information to the group member 202 according to the subscription request from the group member 202.

In practical applications, the group server 301 may include a subscription unit and a presence information transceiver unit. The subscription unit receives a subscription request from the group member 202 for subscribing to the group presence information, sends a sending group presence information notification to the presence information transceiver unit according to the subscription request. Furthermore, the subscription unit sends a subscription request to the presence server 302 for subscribing to the presence information of the group members according to the basic group information.

The presence server 302 receives the subscription request from the subscription unit for subscribing to the presence information of the group members, and sends the presence information of the group members to the presence information transceiver module according to the subscription request received from the subscription unit.

The presence information transceiver unit receives the presence information of the group members from the presence server 302, acquires the group presence information based on the basic group information and the presence information of the group members, and sends the group presence information acquired to the group member 202 in response to receiving the sending group presence information notification from the subscription unit.

If the second manner is adopted, the group server 301 sends the basic group information to the presence server 302. The presence server 302 receives the basic group information from the group server 301, and acquires the group presence information based on the basic group information received and the presence information of the group members stored in the presence server 302. And the presence server 302 sends the group presence information acquired to the group member 202.

In practical applications, the presence server 302 may include an information subscription unit and a presence information transmission unit. The information subscription unit receives the subscription request from the group member 202 for subscribing to the group presence information and sends a sending group presence information notification to the presence information transmission unit according to the subscription request received.

The presence information transmission unit receives the basic group information from the group server 301, acquires the group presence information based on the basic group information received and the presence information of the group members stored in a memory of the presence information transmission unit, and sends the group presence information acquired to the group member 202 in response to receiving the sending group presence information notification from the information subscription unit.

The group server 301, the presence server 302 and the units in the group server 301 may have the functions described above as well as the functions in the first manner and the second manner in FIG. 1, and may function similarly to that described in the flowchart shown in FIG. 1.

Figure 4:
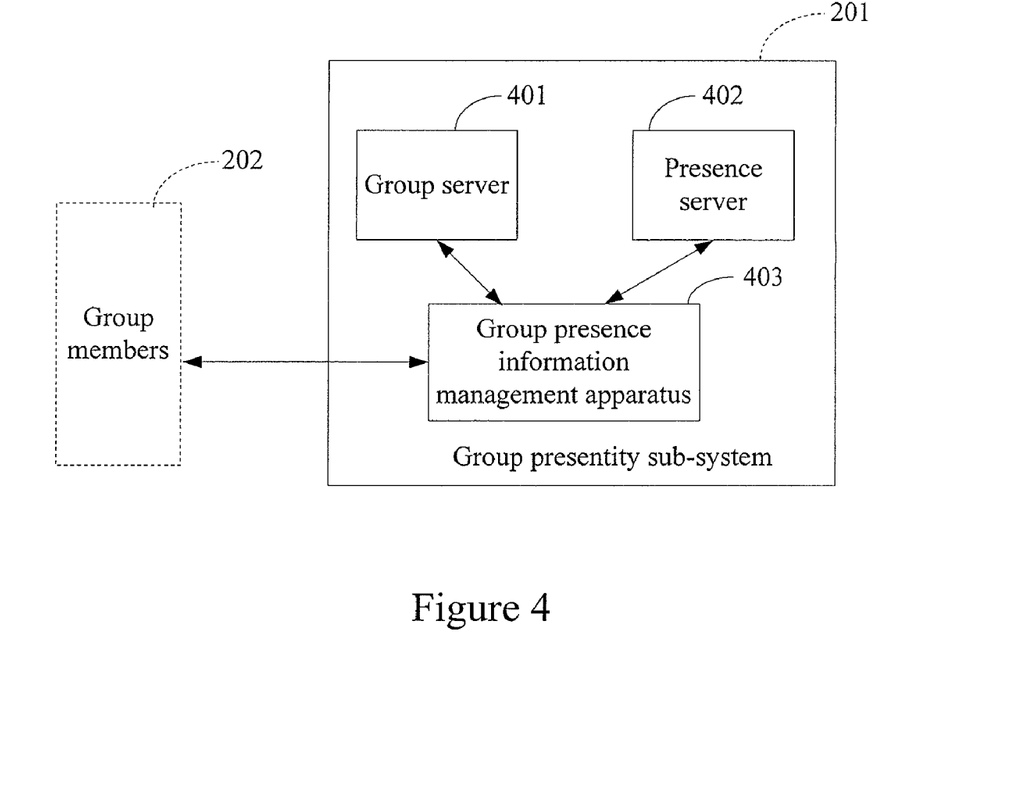
FIG. 4 is a schematic diagram illustrating a detailed structure of the system shown in FIG. 2.

FIG. 4 is a schematic diagram illustrating another detailed structure of the system shown in FIG. 2. As shown in FIG. 4, the group presentity sub-system 201 may include group server 401, presence server 402 and group presence information management apparatus 403. The third manner for performing Action 101 can be employed in this system.

The group server 401 sends the basic group information to the group presence information management apparatus 403.

The presence server 402 sends the presence information of the group members to group presence information management apparatus 403.

The group presence information management apparatus 403 receives the basic group information from the group server 401, and receives the presence information of the group members from the presence server 402. The group presence information management apparatus 403 acquires the group presence information based on the basic group information and the presence information of the group members. The group presence information management apparatus 403 sends the group presence information acquired to the group member 202. The group presence information management apparatus 403 may further receive a subscription request from the group member 202 for subscribing to the group presence information, and sends the group presence information acquired to the group member 202 according to the subscription request received from the group member 202.

In practical applications, the group presence information management apparatus 403 may include a subscription module and a presence information transmission module. The subscription unit receives a subscription request from the group member 202 for subscribing to the group presence information and sends a sending group presence information notification to the presence information transmission module according to the subscription request received from the group member 202.

The presence information transmission module receives the basic group information from the group server 401 and receives the presence information of the group members from the presence server 402. The presence information transmission module acquires the group presence information based on the basic group information and the presence information of the group members. The presence information transmission module sends the group presence information acquired to the group member 202 in response to receiving the sending group presence information notification from the subscription module.

The group server 401, the presence server 402 and the group presence information management apparatus 403 may have the functions described above as well as the functions in the third manner for performing Action 101 in FIG. 1, and may function similarly to that described in the flowchart shown in FIG. 1.

Embodiments of the method and system in accordance with the present invention are described in detail below.

In one embodiment, the first manner for performing Action 101 is applied, and the group entity is a group server.

In this embodiment, a group member sets an authorization policy in a presence server in advance, and group presence information includes the information combining basic group information and presence information of the group members. In this embodiment, the group presence information will be sent to a group member when the group member initiates a subscription request for subscribing to the group presence information. The method in accordance with this embodiment is shown in FIG. 5.

Figure 5:
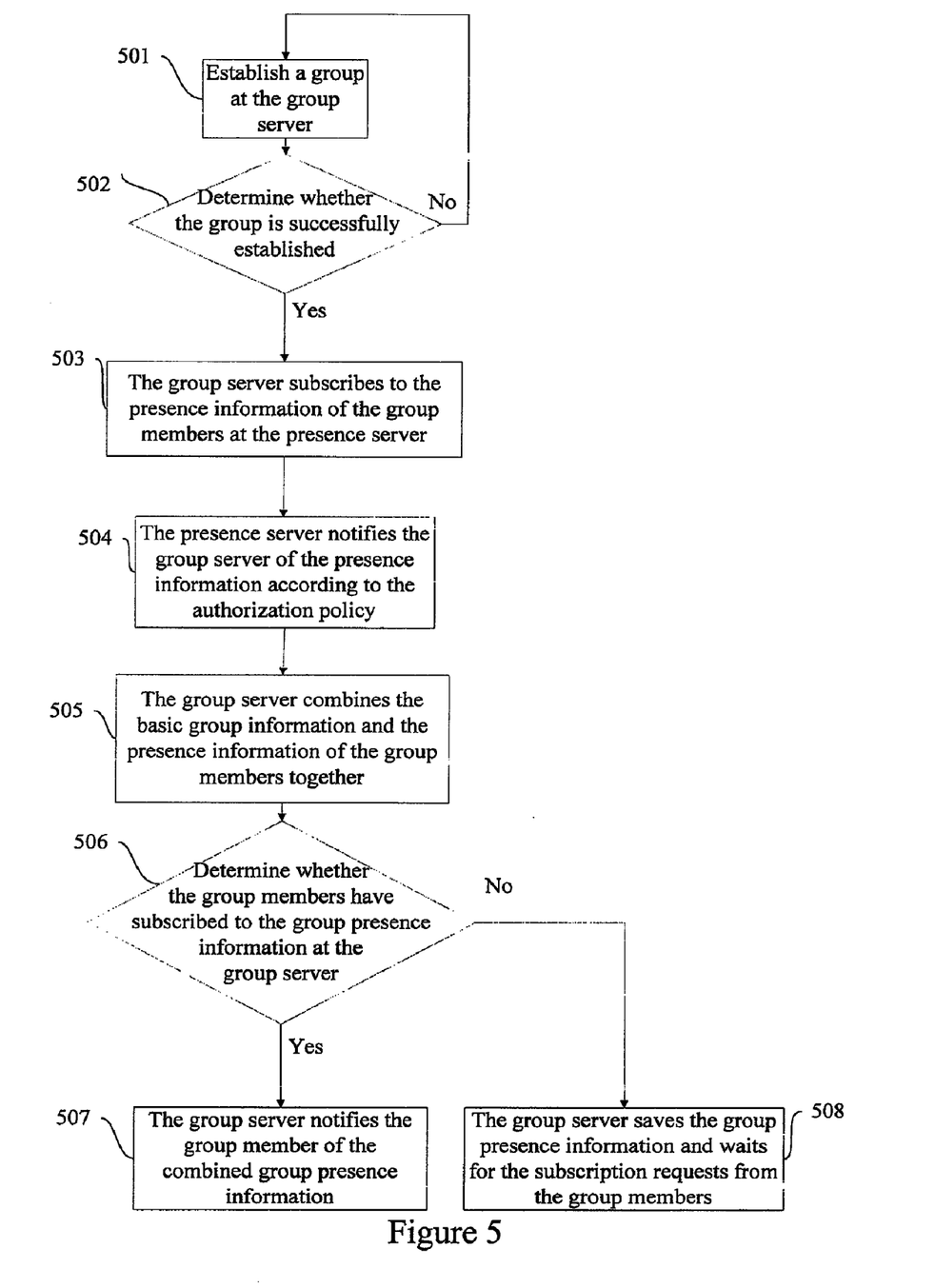
FIG. 5 is a flowchart illustrating a method for sharing presence information in accordance with an embodiment of the present invention.

FIG. 5 is a flowchart illustrating a method for sharing presence information in accordance with this embodiment of the present invention. The method is described below.

Action 501: Establish one or multiple groups in the group server.

In this Action, user A establishes one or multiple groups in the group server, each group may include multiple users, and the multiple users in a group may share information in the group to a certain extent according to group settings.

Action 502: Determine whether the user A has successfully established the group, and if the user A has not established the group successfully, Action 501 is performed again; otherwise Action 503 is performed.

In this Action, the group server determines whether the user A has successfully established the group based on group service rules, e.g. based on whether the format of an establishment request sent by the user A to the group server is correct.

If the user A has not successfully established the group, neither the user A nor the group server will send any request to the presence server. In such a case, preferably, Action 501 can be performed again so that the user A may continue to send an establishment request to the group server.

Action 503: The group server subscribes to the presence information of the group members in the presence server.

In this Action, the group server may subscribe to all of the presence information of a group member, including the willingness information of the group member, the network connection status information of the group member and other presence information of the group member. Or the group server may subscribe to part of the presence information based on needs, e.g. subscribe to the network connection status information of the group member. The group server may also subscribe to the presence information of all group members or to the presence information of part of the group members. For example, if member C has set an authorization policy in advance in the group server to require the group server not to provide the presence information of the member C to other users inside or outside the group, the group server may not subscribe to the presence information of the member C in the presence server.

Action 504: The presence server notifies the presence information of the group members to the group server, the presence information of the group members being combined according to the authorization policies of the group members set in advance.

Since the group members have set the authorization policies in the presence server, the presence information of the group members has to be combined according to the authorization policies of the group members in this Action. In accordance with the authorization policies, the presence information may be all of the presence information of a group member, or part of the presence information of a group member, or the presence information of all group members, or the presence information of part of the group members. Preferably, the presence information of the group members is combined in multipart/related format.

Preferably, in Action 505, the group server combines the basic group information and the presence information of the group members into a combination. And preferably, the basic group information and the presence information of the group members may also be combined in the multipart/related format.

Action 506: Determine whether a group member has subscribed to the group presence information in the group server. If yes, Action 507 is performed when the group member initiates a subscription request to the group server for subscribing to the group presence information; otherwise, Action 508 is performed.

Action 507: The group server notifies the group member of the group presence information, the group presence information being the combination of the basic group information and the presence information of the group members.

Action 508: The group server saves the group presence information and waits for the subscription request of the group member for subscribing to the group presence information.

In the above process of information sharing, the presence information shared by the users is all of the presence information authorized by the group members in the group member list and is sent according to the authorization policies of the group members. However, in practical applications, the group members may also set receiving policies for the shared presence information, e.g. accepting or refusing the shared presence information. Or the group members may set a filtering logic to accept only presence information with specified attributes in all the presence information. For example, a group member may accept only the presence information of the members having the same role as the group member in the group.

The applications of the method shown in FIG. 5 for sharing presence information are further described in detail with reference to FIGS. 6-8.

Figure 6:
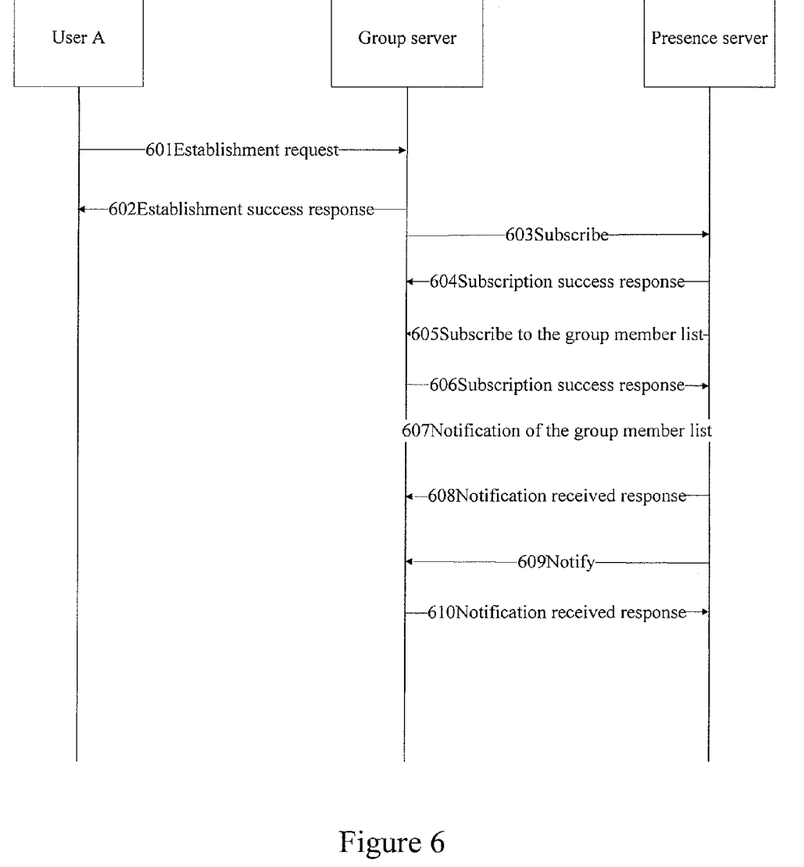
FIG. 6 is a flowchart illustrating the process of establishing a group and the process of subscribing to presence information of group members in accordance with an embodiment of the present invention.

FIG. 6 is a flowchart illustrating the process of establishing a group and the process of the group subscribing to presence information of group members in accordance with an embodiment of the present invention. Referring to FIG. 6, the process is described below.

Action 601: The user A sends an establishment request to the group server to establish group A in the group server.

Action 602: The group server receives the establishment request from the user A and verifies that the establishment request is valid, and the group server sends an establishment success response to the user A.

Action 603: The group server sends a subscription request to the presence server for subscribing to the presence information of the group members of group A.

Multiple groups may be established in the group server by one or multiple users. For convenience, the group A is taken as an example, i.e. the group server acts as the group A to subscribe to the presence information of the members of the group A in the presence server.

Action 604: In response to receiving the subscription request, the presence server sends a subscription success response to the group server to notify the group server that the subscription request from the group server for subscribing to the presence information of the group members has been accepted.

Action 605: The presence server subscribes to the group member list in the group server through sending a subscription request, and determines which user's presence information should be sent to the group server based on the group member list.

Action 606: The group server, in response to receiving the subscription request from the group server for subscribing to the group member list, sends a subscription success response to the presence server, indicating that the group member list will be provided.

Action 607: The group server notifies the presence server of the group member list.

Action 608: The presence server sends a response of receiving the notification to the group server in response to receiving the group member list from the group server.

Action 609: The presence server notifies the group server of the presence information of the group members according to the group member list.

This Action may be performed with a message in the Session Initiation Protocol (SIP), e.g. the SIP NOTIFY message. The header of the SIP NOTIFY message may contain the identity of the group server and the identity of the presence server to indicate which presence server sends the SIP NOTIFY message to which group server. The body of the SIP NOTIFY message may be set in the multipart/related format, and the body of the SIP NOTIFY message may contain the group member list and the presence information of the group members.

Action 610: The group server sends a response of receiving the notification to the presence server in response to receiving the group presence information from the presence server.

By far, the group server has subscribed to the presence information of the group members in the presence server successfully. In this embodiment, the presence server notifies the group server of the presence information of the group members based on the group member list. Alternatively, the presence server may notify the group server of all the presence information saved in the presence server, and the group server sends presence information corresponding to group members to the group members according to the group member list, for example, to the members of the group A.

In Action 603 above, if the group server sends the subscription request to the presence server, the subscription request may contain the group member list, and the Actions 604 to 609 may be therefore combined as that the presence server sends a subscription success response to the group server in response to receiving the subscription request and that the presence server notifies the group server of the presence information of related group members according to the group member list contained in the subscription request.

Figure 7:
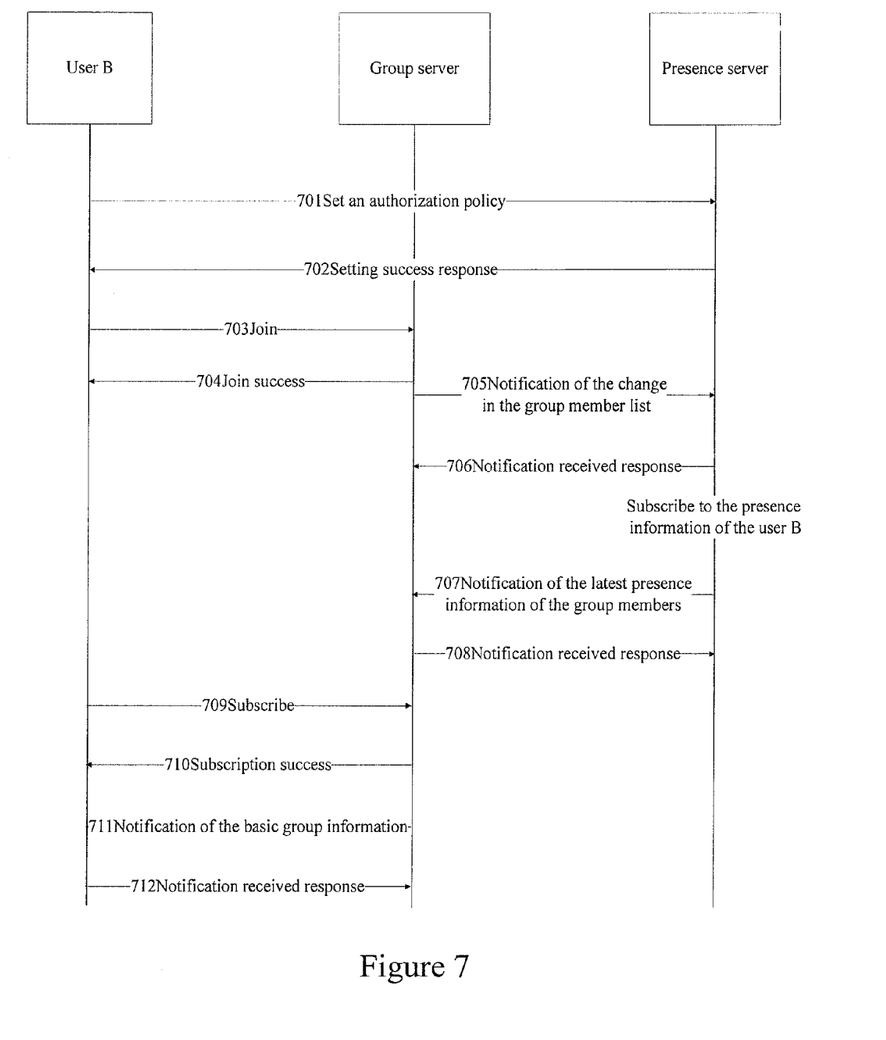
FIG. 7 is a flowchart illustrating the process of a user joining a group and subscribing to group presence information in accordance with an embodiment of the present invention.

FIG. 7 is a flowchart illustrating the process of a user joining a group and subscribing to group presence information in accordance with an embodiment of the present invention. In this embodiment, supposing that user B joins the group A and subscribes to the presence information of other members in the group A, the process of the user joining a group and subscribing to the group presence information is described below.

Action 701: The user B sets an authorization policy for the group A in the presence server.

In this Action, the authorization policy set for the group A includes: whether to provide the presence information of the user B for members of the group A, which members of the group A may be provided with the presence information of the user B, which part of the presence information of the user B may be shared by the members of the group A and even members outside the group A, etc.

Therefore, before joining a group, a user may set the authorization policy for the group in the presence server, e.g. accepting or refusing the subscription of the group to the presence information of the user. If the user does not set any authorization policy for the subscription of the group, the presence server may use a default authorization policy. In the embodiment, the default authorization policy may be accepting the subscription of a group to the presence information of any members in the group. Alternatively, other default authorization policies may also be employed.

Action 702: The presence server sends a setting success response to the user B, indicating that the authorization policy in the presence server goes into effect.

Action 703: The user B sends to the group server a request for joining the group A.

Action 704: The group server sends a joining success response to the user B if the request sent by the user B is valid.

Action 705: The group server sends to the presence server a notification of the change of the group member list.

In this embodiment, the group server notifies the presence server of the group member list which is changed because the new member user B joins the group A.

Action 706: The presence server sends a response of receiving the notification to the group server and adds the presence information of the user B into the subscription of the group A.

Action 707: The presence server notifies the group server of the latest presence information of the group members.

In this Action, the presence information is provided based on the latest group member list after changed.

Action 708: The group server sends a response of receiving the notification to the presence server.

Action 709: The user B initiates a subscription request to the group server for subscribing to the presence information of the group A so as to share the presence information of other members in the group A.

Action 710: The group server sends a subscription success response, indicating that the user B is able to acquire the presence information of the members in the group A.

Action 711: The group server notifies the user B of the group presence information of the group A.

Preferably, the group presence information includes both the basic group information and the presence information of the group members combined by the group server.

Action 712: The user B sends a response of receiving the notification to the group server.

Figure 8:
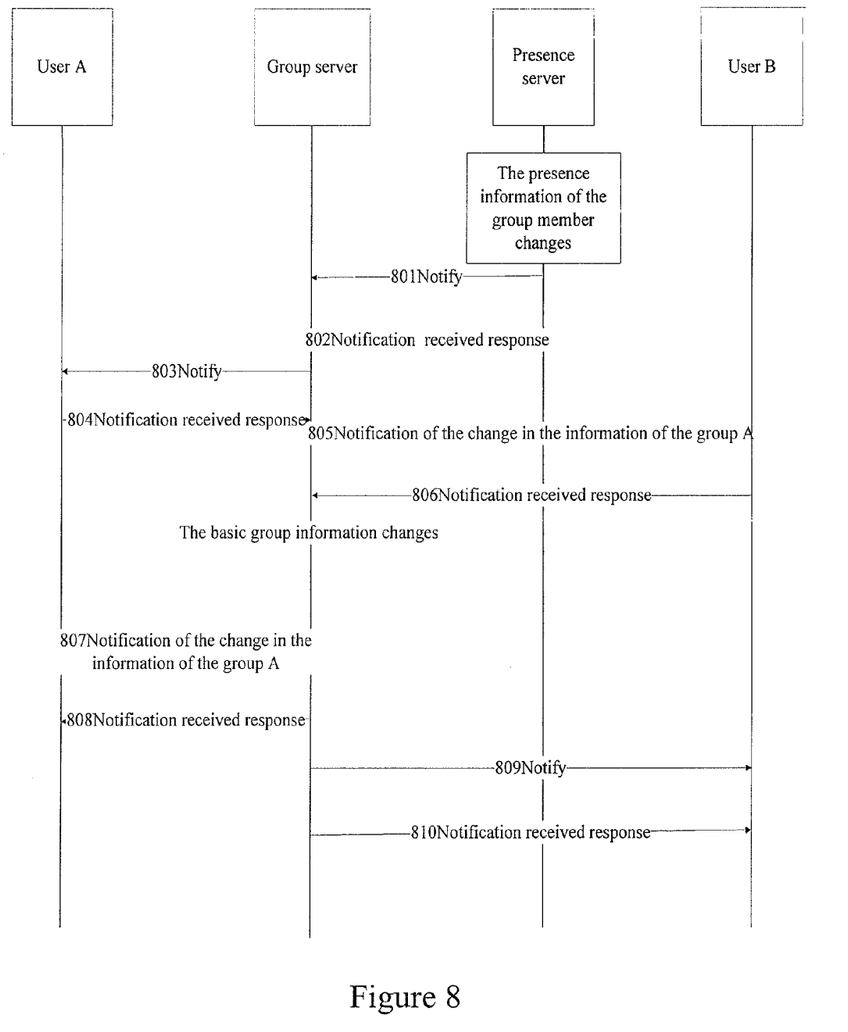
FIG. 8 is a flowchart illustrating the notifying and processing of the change of the group presence information in accordance with an embodiment of the present invention.

FIG. 8 is a flowchart illustrating the notifying and processing of the change of the group presence information in accordance with an embodiment of the present invention. Referring to FIG. 8, the notifying and processing of the change of the group presence information is described below.

If the presence information of the group members changes (e.g. the user B joins the group A), Actions 801 to 806 are performed.

Action 801: The presence server notifies the group server of the latest presence information of the group members.

Action 802: The group server sends a response of receiving the notification to the presence server.

Action 803: The group server notifies the user A of the change in the presence information of the group members in the group A.

Action 804: The user A sends a response of receiving the notification to the group server.

Action 805: The group server notifies the user B of the change in the presence information of the group members in the group A.

Action 806: The user B sends a response of receiving the notification to the group server.

If the basic group information changes (e.g. the attributes of a member in the group A change), the Actions 807 to 810 below are performed.

Action 807: The group server notifies the user A of the change in the basic group information of the group A.

Action 808: The user A sends a response of receiving the notification to the group server.

Action 809: The group server notifies the user B of the change in the basic group information of the group A.

In Action 807 and 809 above, in practical applications, the group server may notify a user through SIP messages, e.g., the SIP NOTIFY message. The header of the SIP NOTIFY message may contain the identity of the group server and the identity of a group member to indicate which group's basic group information should be sent to which group member. The body of the SIP NOTIFY message may be set in the multipart/related format, and the body of the SIP NOTIFY message may contain the basic group information.

Action 810: The user B sends a response of receiving the notification to the group server.

If the basic group information or the presence information of the group members changes, the group server notifies the subscribers of the change in time, and may notify the subscribers of the change in the basic group information or the change in the presence information of the group members separately.

In another embodiment, the second manner for performing Action 101 is applied, and the group entity is a presence server.

Figure 9:
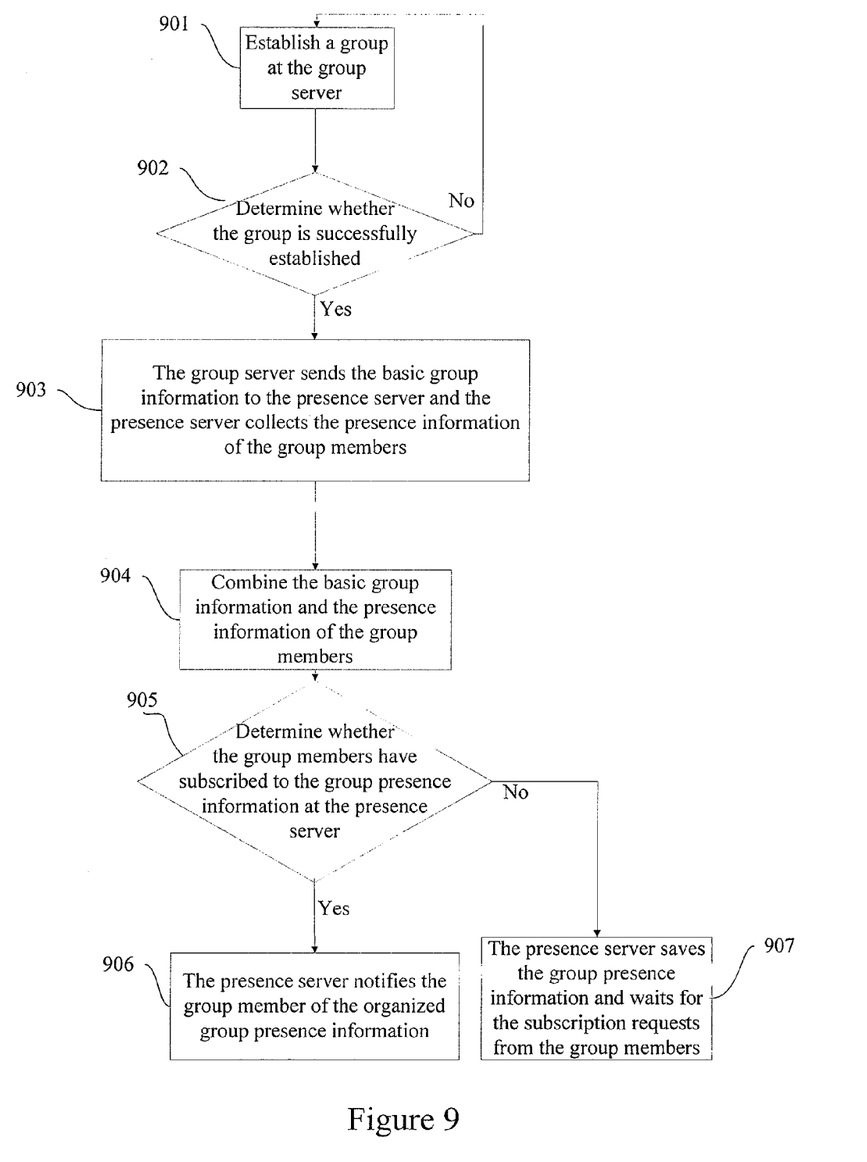
FIG. 9 is a flowchart illustrating a method for sharing presence information in accordance with an embodiment of the present invention.

FIG. 9 is a flowchart illustrating a method for sharing presence information in accordance with this embodiment of the present invention. Referring to FIG. 9, the method is described below.

Action 901: Establish one or multiple groups in the group server.

In this Action, the user C may establish one or multiple groups in the group server, each group may include multiple users, and the multiple users in a group may share information in the group to a certain extent according to group settings.

Action 902: Determine whether the user C has successfully established the group. If the user C has not established the group successfully, Action 901 is performed again; otherwise Action 903 is performed.

In this Action, the group server determines whether the user C has successfully established the group based on corresponding group service rules, e.g. based on whether the format of an establishment request sent by the user C to the group server is correct.

If the user C has not established the group successfully, preferably, Action 901 is performed again so that the user C continues to send an establishment request to the group server.

Action 903: If a group has been established successfully, the group server sends the basic group information of the group to the presence server and the presence server collects presence information of the group members.

In this Action, the group server may send the basic group information of the group with SIP message, e.g. the SIP NOTIFY message. The header of the SIP NOTIFY message may contain the identity of the group server and the identity of the presence server to indicate which group server sends the SIP NOTIFY message to which presence server. The body of the SIP NOTIFY message may contain the basic group information.

Action 904: The presence server combines the basic group information and the presence information of the group members into a combination as the group presence information of the group.

The basic group information is published by the group server in real time to the presence server, and the presence information of the group members is collected by the presence server. The presence server then combines the basic group information and the presence information of the group members into a combination as the group presence information.

The group server may set an authorization policy of the group server itself, e.g. a default policy may be set as: the group members are allowed to subscribe to the presence information of the group. Then the group members may subscribe to the group presence information in the presence server.

Action 905: Determine whether a group member has subscribed to the group presence information in the presence server. If the group member has subscribed, Action 906 is performed if the group member initiates a subscription request to the presence server for subscribing to the group presence information; otherwise Action 907 is performed.

Action 906: The presence server notifies the group member of the group presence information including the basic group information and presence information of the group members which are combined together, so that the group members may share the presence information with each other.

Action 907: The presence server saves the group presence information and waits for the subscription request of the group member for subscribing to the group presence information.

In yet another embodiment 3, the third manner for performing Action 101 is applied, and the group entity is a group presence information management apparatus.

Figure 10:
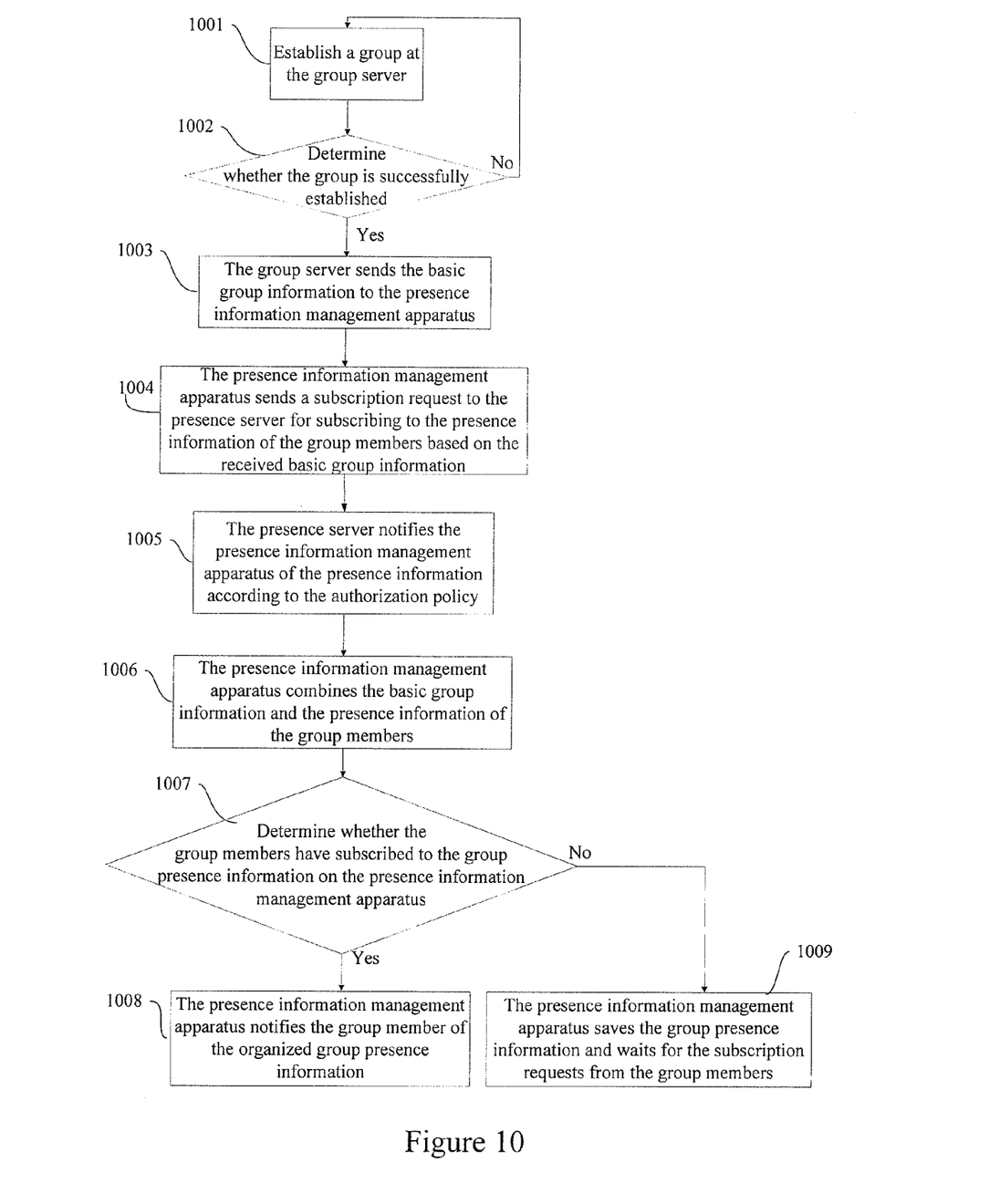
FIG. 10 is a flowchart illustrating a method for sharing presence information in accordance with an embodiment of the present invention.

FIG. 10 is a flowchart illustrating a method for sharing presence information in accordance with this embodiment of the present invention. Referring to FIG. 10, the method is described below.

Action 1001: Establish one or multiple groups in the group server.

In this Action, user D establishes one or multiple groups in the group server, each group may include multiple users, and the multiple users in the group may share information in the group to a certain extent according to the group settings.

Action 1002: Determine whether the user D has successfully established the group. If the group D has not been established successfully, Action 1001 is performed again; otherwise Action 1003 is performed.

In this Action, the group server determines whether the user D has successfully established the group based on corresponding group service rules, e.g. based on whether the format of an establishment request sent by the user D to the group server is correct.

If the user D has not successfully established the group, neither the user D nor the group server will send a request to the presence server. In such a case, preferably, Action 1001 may be performed again, so that the user D may continue to send to the group server an establishment request.

Action 1003: The group server sends the basic group information to the group presence information management apparatus.

Action 1004: The group presence information management apparatus subscribes to the presence information of the group members in the presence server according to the basic group information.

In this Action, the group presence information management apparatus may subscribe to all presence information of a group member in the presence server, including the willingness information of the group member, network connection status information of the group member and other presence information of the group member. Or, the group presence information management apparatus may subscribe to part of the presence information, for example, subscribe only to the network connection information of the group member. Moreover, the group presence information management apparatus may subscribe to the presence information of all group members in the presence server, or to the presence information of part of the group members. For example, if member E has set an authorization policy in the group presence information management apparatus to require the group presence information management apparatus not to provide the presence information of the member E to other users inside or outside the group, the group presence information management apparatus may not subscribe to the presence information of the member E in the presence server.

Action 1005: The presence server notifies the group presence information management apparatus of the presence information of the group members, which is combined according to the authorization policies of the group members set in advance.

Because the group members have set authorization policies in the presence server, the presence information of the group members has to be combined according to the authorization policies of the group members in this Action. In accordance with the authorization policies, the presence information may be all of the presence information of a group member, or part of the presence information of a group member. Or, the presence information may be the presence information of all group members, or the presence information of part of the group members. Preferably, the presence information of the group members is combined in the multipart/related format.

Preferably, in Action 1006, the group presence information management apparatus combines the basic group information and the presence information of the group members together; and preferably, the basic group information and the presence information of the group members are also combined in the multipart/related format.

Action 1007: Determine whether a group member has subscribed to the group presence information in the group presence information management apparatus. If the group member has subscribed, Action 1008 is performed when the group member initiates a subscription request to the group presence information management apparatus for subscribing to the group presence information; otherwise Action 1009 is performed.

Action 1008: The group presence information management apparatus notifies the group member of the group presence information combining the basic group information and the presence information of the group members.

Action 1009: The group presence information management apparatus saves the group presence information and waits for a request from a group member to subscribe to the group presence information.

In the above process of information sharing, the presence information shared by the users is all of the presence information authorized by the group members in the group member list and is sent according to the authorization policies of the group members. However, in practical applications, the group members may also set receiving policies for the shared information, e.g., accepting or refusing the shared presence information, or setting a filtering logic to accept information with specified attributes from all of the presence information. For example, a group member may accept only the presence information of the members having the same role as the group member in the group.

The embodiments above describe technical scheme and merits of the present invention. It should be understood that the above are only embodiments of the present invention and are not for use in limiting the protection scope of the present invention; and that those skilled in the art may change or modify the present invention without departing from the spirit or basic theory thereof. Therefore, any modification, equivalent replacement or improvement made under the spirit and principles of the present invention shall fall into the protection scope of the present invention.

What is claimed is:

1. A method for sharing presence information, comprising:
    acquiring, by one of a group server, a presence server and a presence information management apparatus connected to the group server and the presence server, group presence information comprising basic group information and presence information of at least one group member in a group provided by the group server; wherein the basic group information is from the group server and comprises a group attribute, a group member list and a group member attribute, the presence information of at least one group member is from the presence server; and
    sending, by the one of the group server, the presence server and the presence information management apparatus, the group presence information to a group member.

2. The method of claim 1, further comprising:
    receiving a subscription request initiated by the group member for subscribing to the group presence information.

3. The method of claim 1, wherein the process of acquiring group presence information comprises:
    acquiring presence information of a group member if the presence information of a group member changes.

4. The method of claim 3, further comprising:
    acquiring the basic group information if the basic group information changes; and
    sending the basic group information to the group member.

5. The method of claim 1, wherein the process of acquiring group presence information comprises:
    receiving, by the group server, the presence information of at least one group member from the presence server; and
    acquiring, by the group server, the group presence information according to the presence information of at least one group member and the basic group information saved in the group server;
    the process of sending the group presence information to the group member comprises:
    sending, by the group server, the group presence information to the group member.

6. The method of claim 5, further comprising:
    sending, by the group server, a subscription request for subscribing to the presence information of a group member to the presence server and
    sending, by the presence server, the presence information of a group member to the group server according to the subscription request for subscribing to the presence information of a group member.

7. The method of claim 5, further comprising:
    sending, by the group server, a group member list to the presence server, and
    acquiring, by the presence server, the presence information of a group member in the group member list.

8. The method of claim 1, wherein the acquiring group presence information comprises:
    sending, by the group server, the basic group information to the presence server, and
    acquiring, by the presence server, the group presence information according to the presence information saved in the presence server and the basic group information;
    the process of sending the group presence information to the group member comprises:
    sending, by the presence server, the group presence information to the group member.

9. The method of claim 1, wherein the acquiring group presence information comprises:
    sending, by the group server, the basic group information to the group presence information management apparatus;
    sending, by the presence server, the presence information of at least one group member to the group presence information management apparatus; and acquiring, by the group presence information management apparatus, the group presence information according to the received basic group information and the received presence information of at least one group member;

wherein the process of sending the group presence information to the group member comprises:

sending, by the group presence information management apparatus, the group presence information to the group member.

10. The method of claim 9, further comprising:

sending, by the group presence information management apparatus, according to the basic group information from the group server, a subscription request containing a group member list to the presence server for subscribing to the presence information of at least one group member;

wherein the presence server sends the presence information of at least one group member in the group member list to the group presence information management apparatus according to the subscription request.

11. A system for sharing presence information, comprising:

a group presentity sub-system and at least one group member; wherein the group presentity sub-system is capable of acquiring group presence information and sending the group presence information to one of the at least one group member;

wherein the group presentity sub-system comprises:

a presence server, capable of sending presence information of the group member, and a group server, capable of receiving the presence information of the group member from the presence server, acquiring the group presence information according to the presence information of the group member and basic group information saved in the group server, and sending the group presence information to the group member; and wherein the basic group information comprises a group attribute, a group member list and a group member attribute.

12. The system of claim 11, wherein the group server is further capable of:

receiving a subscription request for subscribing to the group presence information from the group member, and sending a subscription request for subscribing to the presence information of the group member to the presence server according to the basic group information;

wherein the group server sends the group presence information to the group member according to the subscription request from the group member; and the presence server is further capable of:

receiving the subscription request for subscribing to the presence information of the group member from the group server and sending the presence information of the group member to the group server according to the subscription request from the group server.

13. A system for sharing presence information, comprising:

a group presentity sub-system and at least one group member; wherein the group presentity sub-system is capable of acquiring group presence information and sending the group presence information to one of the at least one group member, wherein the group presentity sub-system comprises:

a group server, capable of sending basic group information;

a presence server, capable of receiving the basic group information from the group server, acquiring the group presence information according to the basic group information and presence information of the group member saved in the presence server, and sending the group presence information to the group member;

wherein the basic group information comprises a group attribute, a group member list and a group member attribute.

14. The system of claim 13, wherein the presence server is further capable of receiving a subscription request for subscribing to the group presence information from the group member and sending the group presence information to the group member according to the subscription request from the group member.

15. A system for sharing presence information, comprising:

a group presentity sub-system and at least one group member; wherein the group presentity sub-system is capable of acquiring group presence information and sending the group presence information to one of the at least one group member, wherein the group presentity sub-system comprises:

a group server, capable of sending basic group information;

a presence server, capable of sending presence information of the group member; and a group presence information management apparatus, capable of receiving the basic group information from the group server and the presence information of the group member from the presence server, and sending group presence information comprising the basic group information and the presence information of the group member to the group member;

wherein the basic group information comprises a group attribute, a group member list and a group member attribute.

16. The system of claim 15, wherein the group presence information management apparatus is further capable of receiving a subscription request for subscribing to the group presence information from the group member;

wherein the group presence information management apparatus sends the group presence information to the group member according to the subscription request from the group member.

17. A group server, comprising:

a subscription unit, capable of receiving a subscription request for subscribing to group presence information from a group member, and sending a subscription request for subscribing to presence information of at least one group member according to basic group information, wherein the basic group information comprises a group attribute, a group member list and a group member attribute; and a presence information transceiver unit, capable of receiving the presence information of the at least one group member, and sending the group presence information comprising the basic group information and the presence information of the at least one group member to the group member according to the subscription request from the group member.

18. A presence server, comprising:

an information subscription unit, capable of receiving a subscription request for subscribing to group presence information from a group member; and a presence information transmission unit, capable of receiving basic group information from a group server, and sending the group presence information comprising the basic group information and presence information of at least one group member to the group member according to the subscription request;

wherein the basic group information comprises a group attribute, a group member list and a group member attribute.

19. A presence information management apparatus, comprising:

a subscription module, capable of receiving a subscription request from a group member for subscribing to group presence information;

a presence information transceiver module, capable of receiving basic group information from a group server and presence information of at least one group member from a presence server, and sending group presence information comprising the basic group information and the presence information of the at least group member to the group member according to the subscription request; and wherein the basic group information comprises a group attribute, a group member list and a group member attribute.

* * * * *